(12) United States Patent
Richards et al.

(10) Patent No.: US 6,536,292 B1
(45) Date of Patent: Mar. 25, 2003

(54) TRIAXIAL FORCE PIN SENSOR ARRAY

(75) Inventors: Gary William Richards, Clinton, OH (US); Samuel Kelly Clark, Ann Arbor, MI (US); Aurel Vincent Stan, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/554,403

(22) PCT Filed: Feb. 4, 1998

(86) PCT No.: PCT/US98/02186

§ 371 (c)(1),
(2), (4) Date: May 11, 2000

(87) PCT Pub. No.: WO99/40404

PCT Pub. Date: Aug. 12, 1999

(51) Int. Cl.⁷ .............................. G01D 7/00; G01L 1/22
(52) U.S. Cl. ........................... 73/862.041; 73/862.043; 73/862.044; 73/862.045
(58) Field of Search ................... 73/862.46, 862.42, 73/720, 726, 862.041, 862.042, 862.043, 862.044, 862.045, 862.046, 862.471, 862.474

(56) References Cited

U.S. PATENT DOCUMENTS

| | | | |
|---|---|---|---|
| 2,918,816 A | 12/1959 | Ormond | |
| 3,581,563 A | 6/1971 | Christie et al. | |
| 3,589,182 A | 6/1971 | Burgett | |
| 4,181,011 A | * 1/1980 | Brendel | 73/141 |
| 4,630,470 A | 12/1986 | Brooke et al. | |
| 4,712,431 A | * 12/1987 | Hatamura | 73/862.042 |
| 4,986,118 A | * 1/1991 | Pottinger | 73/146 |
| 4,986,119 A | 1/1991 | Gicewicz | |
| 5,341,687 A | 8/1994 | Stan | |
| 5,396,817 A | 3/1995 | Rosenweig | |
| 5,522,144 A | 6/1996 | Smoorenburg | |
| 5,995,451 A | * 11/1999 | Evans et al. | 367/139 |

FOREIGN PATENT DOCUMENTS

EP 0656269 6/1995

* cited by examiner

Primary Examiner—Hezron Williams
Assistant Examiner—Lilybett Martir
(74) Attorney, Agent, or Firm—Howard M. Cohn (57) ABSTRACT

A triaxial force pin sensor array for measuring the actual forces generated in the footprint of a tire includes a high density of individual force pin sensors in a modular design that allows for rapid replacement of defective sensor array elements and substantially prevents dirt and contamination from affecting force measurements. The triaxial force pin sensor array further reduces electromagnetic interference (EMI) and radio frequency (RF) contamination of the sampled data signals. The triaxial force pin sensor array exhibits uniform response in the normal direction, $F_z$, regardless of contact location with individual triaxial force pins of the sensor array. Further, the triaxial force pin sensor array features mechanical overload protection.

20 Claims, 5 Drawing Sheets

TRIAXIAL FORCE PIN SENSOR ARRAY

TECHNICAL FIELD

This invention relates to an improved sensor array for measuring forces. More particularly, the present invention relates to an improved force pin, sensor array for measuring triaxial forces, such as those generated in the footprint of a tire.

BACKGROUND ART

The prior art includes a variety of sensors incorporating strain gauges built into specialized instruments designed to measure forces on various objects. For example, U.S. Pat. No. 2,918,816 discloses an improved six-component strain gauge balance system for use in high pressure wind tunnels to measure simultaneously the six major forces and moments corresponding to the six degrees of freedom of any three dimensional body under test. The patent describes a cylindrical sleeve for attaching to the tested object and a core within the sleeve for attaching to a support in the wind tunnel. Annular torsion load cells, axial rhombic-shaped load cells, and diametrical cantilevered load cells are connected between the sleeve and core to measure the various forces.

In relation to pneumatic tires, European Patent No 0 656 269 A1 discloses an essentially two-dimensional array of sensors used to indicate tire inflation by determining the distribution of contact forces over the footprint of a pneumatic tire. The sensors in the array measure only normal force, and are preferably flat detectors such as piezoelectric or piezoresistive polymer film sensors. A related U.S. Pat. No. 5,396,817 concerns similar measurements utilizing a mainly linear array of strain gage sensors.

An example of measuring tire forces is seen in U.S. Pat. No. 4,986,118 ('118) which discloses an array of force sensors, each separately constructed of a vertical hollow tubular member, either square or cylindrical in cross section, with strain gages secured to the vertical surfaces of the member to measure forces applied by a tire to the top bearing surface of the tubular member. Concentrically inside each tubular member is a motion sensor to measure relative tire tread motion. The motion sensor includes an elongated pin having a pointed tip extending beyond the bearing surface of the tubular member so that the tip penetrates the tread of the tire under test, and includes strain gages secured to the pin to indicate the motion of the pin and therefore the motion of the tread of the tire penetrated by the pin.

As disclosed in the '118 patent, the prior art includes sensors for measuring the contact pressure of a tire. For example, one prior art system included a plurality of individual pressure sensors in a transducer system to measure the local triaxial contact pressure and the tangential slip pressures in the contact patch, i.e. the "footprint", of a tire. This system allowed for measurements along each rib in a tread pattern of a tire to determine factors such as high local pressures and high slip pressures that cause uneven tire wear. The prior art sensors were stable, temperature compensated, high frequency transducers which were typically mounted in an array that was strong enough to support a moving tire.

The prior art pressure sensors, as described in a product description entitled "Tire-Road Contact Pressure Sensors" from PRECISION MEASUREMENT CO. of An Arbor, Mich., included individual cantilever pins electrically connected to a temperature compensated strain gauge system that enabled each of the individual pins to simultaneously measure the vertical contact force, the fore-aft tangential force, and the lateral tangential force. A concern relating to the prior art contact pressure sensors was the use of a pressure member diaphragm (membrane) at the contact surface that was less sensitive at the edges than in the center of the membrane. Also, each of the prior art contact sensor pins was individually mounted which, due to geometric size limitations, enabled a limited number of pins to be joined together for individually measuring the forces generated in the footprint of a tire. In some cases, only a single triaxial force pin sensor was typically used to fully map the forces and pressures generated in the footprint. To fully map the forces generated in a tire footprint with the prior art system, the tire would be passed across a limited number of pressure contact sensors multiple times due to geometric considerations. The geometric consideration mentioned above relates to the minimum center to center distance between adjacent contact pressure sensors.

OBJECTS AND SUMMARY OF THE INVENTION

It is an object of the present invention to provide a triaxial force pin sensor array, the triaxial force pin sensor array being as defined in one or more of the appended claims and, as such, having the capability of being constructed to accomplish one or more of the following subsidiary objects.

It is an object of the present invention to provide a triaxial force pin sensor array for measuring triaxial forces, such as those generated in the footprint of a tire, that obviates the problems and limitations of the prior art systems.

It is another object of the present invention to provide a triaxial force pin sensor array that incorporates a modular design that allows for rapid replacement of defective sensor array elements.

Another object of the invention is to provide a method of measuring the actual forces generated in the footprint of a tire with a triaxial force pin sensor array that substantially prevents dirt and contamination from affecting force measurements.

Yet another object of the invention is to provide a triaxial force pin sensor array which reduces electromagnetic interference (EMI) and radio frequency (RF) contamination of the sampled data signals.

A still further object of the present invention is to provide a triaxial force pin sensor array which exhibits uniform response in the normal direction, $F_z$, regardless of contact location with individual triaxial force pins of the sensor array.

Another object of the present invention is to provide a triaxial force pin sensor array that features mechanical overload protection.

Still another object of the invention is to provide a triaxial force pin sensor array which includes a high density of individual force pin sensors.

Accordingly, there is provided a triaxial force pin sensor array module that has two triaxial force pin sensor arrays mounted together. Each of the triaxial force pin sensor arrays has a plurality of cantilever force pins to measure the local normal pressure and the tangential force applied to an upper contact surface of the pins. The individual cantilever force pins have a region of reduced cross section extending around the circumference thereof and two slots disposed in opposite facing directions between the region of reduced cross section and the contact surface. The slots are disposed in spaced relation to the upper contact surface forming a shear plate or web whose sensitivity to the contact pressure is determined by the thickness of the web between the reduced section and the diameter of internal bore extending through the web. Sensors are mounted to the opposite facing side surfaces of the cantilever force pins in the region of reduced cross section and to a surface in between the two slots.

According to the invention, the triaxial force pin sensor array module is preferably constructed of a material having a material proportional limit of at least about 30,000 pounds per square inch (psi) ($2.07 \times 10^8$ newtons/meter$^2$ (n/m$^2$)) and up to about 100,000 psi ($6.89 \times 10^8$ n/m$^2$), such as for example aircraft aluminum or beryllium copper. The high material proportional limit insures that the force pins will move from the force applied thereto without any plastic deformation in the range possible due to the location of an adjacent pin or side wall of the sensor array. The construction material preferably has natural shielding capability which reduces electromagnetic interference (EMI) and radio frequency (RF) contamination of the sampled data.

Further in accordance with the invention, a sealant, such as a silicone rubber, having a modulus between about 100 pounds per square inch (psi) ($6.89 \times 10^5$ n/m$^2$) and about 1000 psi ($6.89 \times 10^6$ n/m$^2$) is disposed about each of the cantilever force pins to prevent dust and dirt particles from accumulating therebetween while not materially affecting the movement of the pins.

IN THE DRAWINGS

The structure, operation, and advantages of the presently preferred embodiments of the invention will become further apparent upon consideration of the following description taken in conjunction with the accompanying drawings.

DETAILED DESCRIPTION OF THE INVENTION

Figure 1:
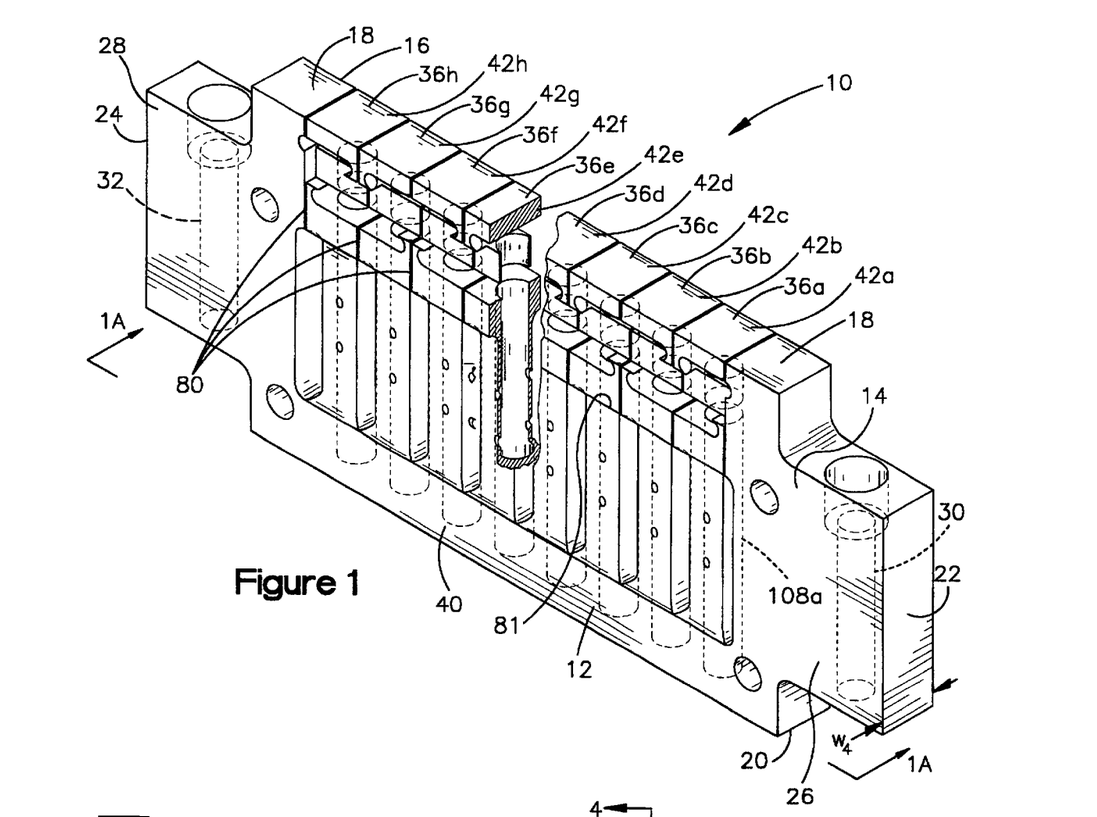
FIG. 1 is a three dimensional view of a triaxial force pin sensor array in accordance with the present invention.
Figure 7:
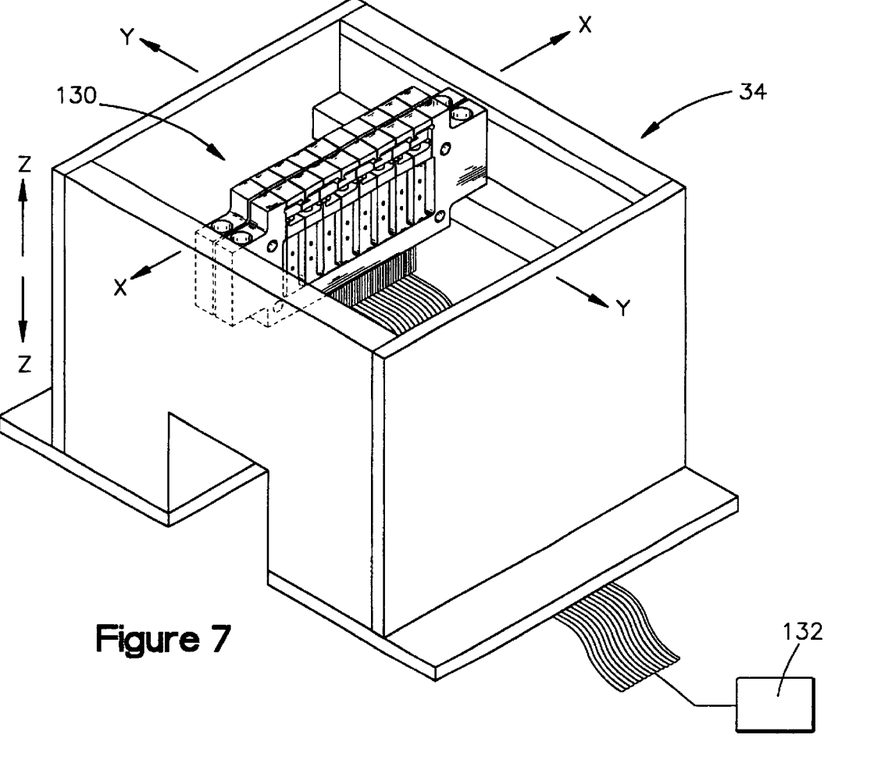
FIG. 7 is an assembly view of a triaxial fore pin sensor array module mounted in a frame.
Figure 8A:
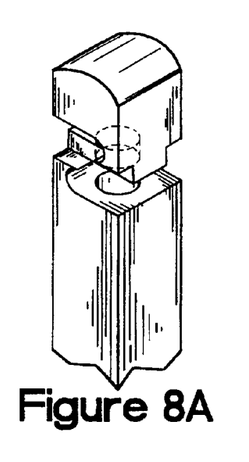
FIG. 8A is an alternative embodiment of a force pin having a radiused contact surface.
Figure 8B:
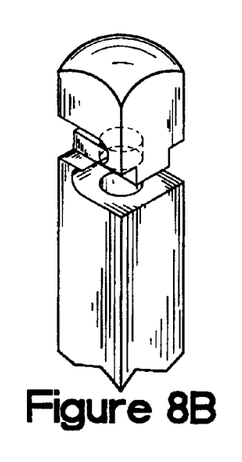
FIG. 8B is an alternative embodiment of a force pin having a convexed contact surface.
Figure 8C:
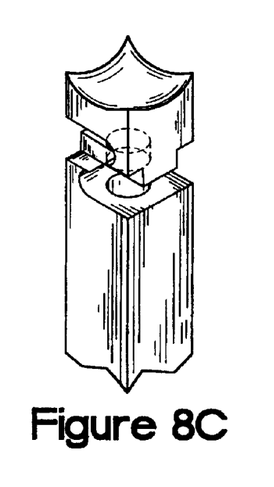
FIG. 8C is an alternative embodiment of a force pin having a concaved contact surface.

Referring to FIG. 1, there is illustrated a three-dimensional view of a triaxial force pin sensor array 10 in accordance with the present invention. The sensor array 10 includes a force pin support structure 12 having a first and second opposite side portions 14 and 16, upper and lower end surfaces 18 and 20, and first and second side surfaces 22 and 24. At either side of the support structure 12 there is located a mounting portion 26 and 28 having a throughbore 30 and 32, respectively, through which an attachment bolt (not shown) secures the sensor array 10 to a sensor array mounting frame structure 34 as illustrated in FIG. 7 and discussed in detail hereinafter.

CANTILEVER TRIAXIAL FORCE PINS

Preferably, the support structure 12 includes a plurality of cantilever triaxial force pins 36a, 36b, 36c, 36d, 36e, 36f, 36g, 36h(36a–36h), which are located adjacent to each other and are integrally attached to the base portion 40 of the support structure 12. Each of the cantilever force pins 36a–36h are identical and therefore only pin 36b, as illustrated in FIGS. 4, 5, 5A, and 5B, is described in detail since the details of the construction of each triaxial pin are substantially the same. While eight cantilever force pins 36a–36h are illustrated, it is within the terms of the invention to provide more or fewer cantilever force pins depending upon the specific application.

Cantilever pin 36b has an upper contact surface 42b which can be flat, radiused, convexed or concaved, as shown in FIGS. 5, 8A 8B, and 8C, respectively. In the preferred embodiment of the invention, the contact surface 42b is flat as shown in FIG. 1. The forces being measured, typically those generated in a tire footprint, are transferred to the contact surface of each of the cantilever pins 36a–36h. The contact surface 42b (see FIGS. 4 and 5) of cantilever pin 36b preferably has a rectangular cross-section disposed in a plane perpendicular to the longitudinal axis 44b extending through the cantilever pin, although it is within the terms of the invention to construct the cantilever pins 36a–36h with alternate cross-sections, such as for example, circular and oval cross-sections.

Figure 4:
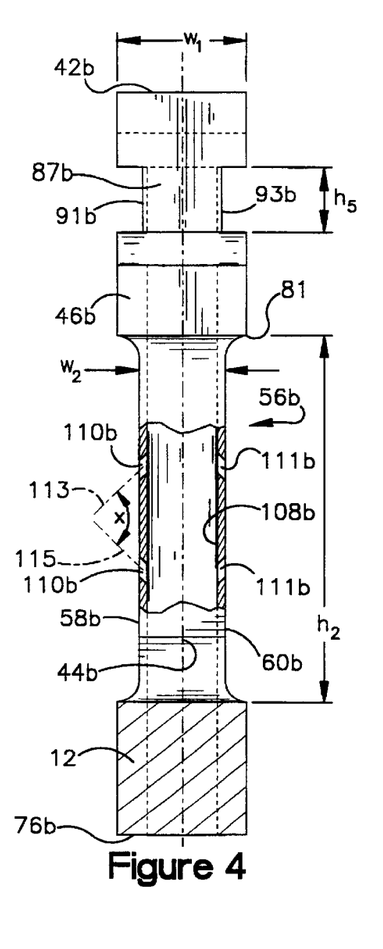
FIG. 4 is a view through line 4—4 of FIG. 1A.
Figure 5:
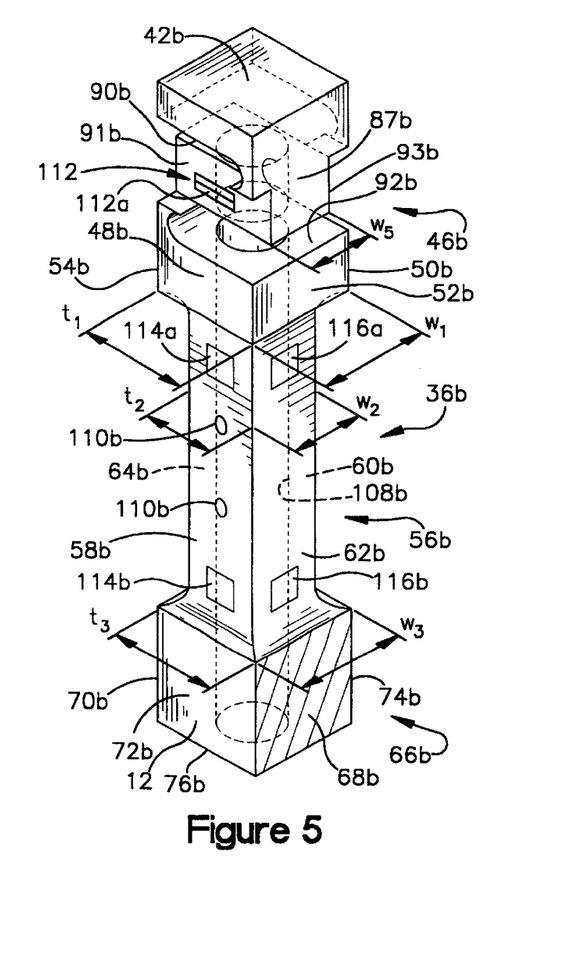
FIG. 5 is a schematic illustration of a single sensor pin of the triaxial force pin sensor array of FIG. 1.
Figure 5A:
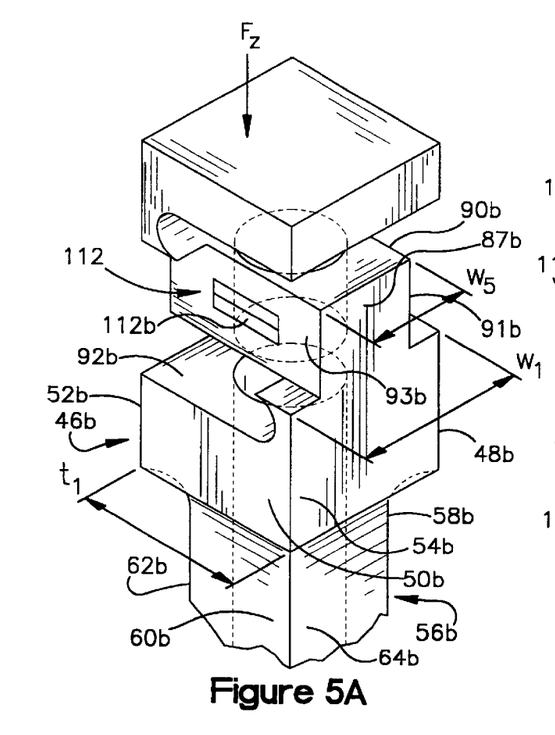
FIG. 5A is an enlarged view of the top portion of the triaxial force pin rotated 180° from the position shown in FIG. 5.

Pin 36b, as shown in FIGS. 4, 5, 5A and 5B, has an upper portion 46b with a rectangular or square cross-section that has opposite front and rear surfaces 48b and 50b, respectively, spaced a distance $w_1$ from each other and opposite side surfaces 52b and 54b spaced a distance $t_1$ from each other. Below the upper portion 46b is an intermediate portion or region 56b which also has a substantially rectangular or square cross-section that has opposite front and rear surfaces 58b and 60b, respectively, spaced a distance $w_2$ between each other and opposite side surfaces 62b and 64b, respectively, spaced a distance $t_2$. The upper portion 46b is contiguous with and integrally attached to the intermediate portion 56b by a plurality of curved surfaces which extend around the perimeter of the force pin, i.e., interconnecting surfaces 48b and 58b, surfaces 50b and 60b, surfaces 52b and 62b, and surfaces 54b and 64b, as best seen in FIG. 5A. A feature of the invention is that the distance $w_1$ and $t_1$ between the opposite surfaces in upper portion 46b are longer, respectively, than the corresponding opposite surfaces in intermediate portion 56b having distances $w_2$ and $t_2$. Below the intermediate portion 56b is a base portion 66b which also has a substantially rectangular or square cross-section and has opposite front and rear surfaces 72b and 74b spaced a distance $w_3$ from each other and opposite side surfaces 68b and 70b, respectively, spaced a distance $t_3$ from each other. The intermediate portion 56b is contiguous with and integrally attached to the base portion 66b by a plurality of curved, concave surfaces, as best seen in FIG. 5. The bottom surface 76b of pin 36b is contiguous with and forms an integral portion of base portion 40 of support structure 12.

Since the pins 36a–36h are each attached soley at the bottom of their intermediate portion, i.e. by the concave surfaces to the base portion of the support structure 12, the pins are effectively mounted in a cantilevered manner with respect to base portion 40.

TRIAXIAL FORCE PIN SENSOR ARRAY

The triaxial force pin sensor array 10, which includes a plurality of cantilever triaxial force pins 36a–36h, can be machined from a single block of material into a shape as generally shown in FIGS. 1, 1A, 2 and 3. That is, the block of material is initially shaped into a generally rectangular form having a distance $w_4$ in the mounting portions 26 and 28 and a height $h_1$ between the upper end surface 18 and the lower end surface 20, see FIGS. 1 and 1A. A plurality of slits 80 are open at the upper end surface 18 of the support structure 12 and extend to the location 81 which coincides with the upper end of elongated through-slots 82a–82i between adjacent triaxial force pins 36a–36h, as discussed in detail below.

Figure 1A:
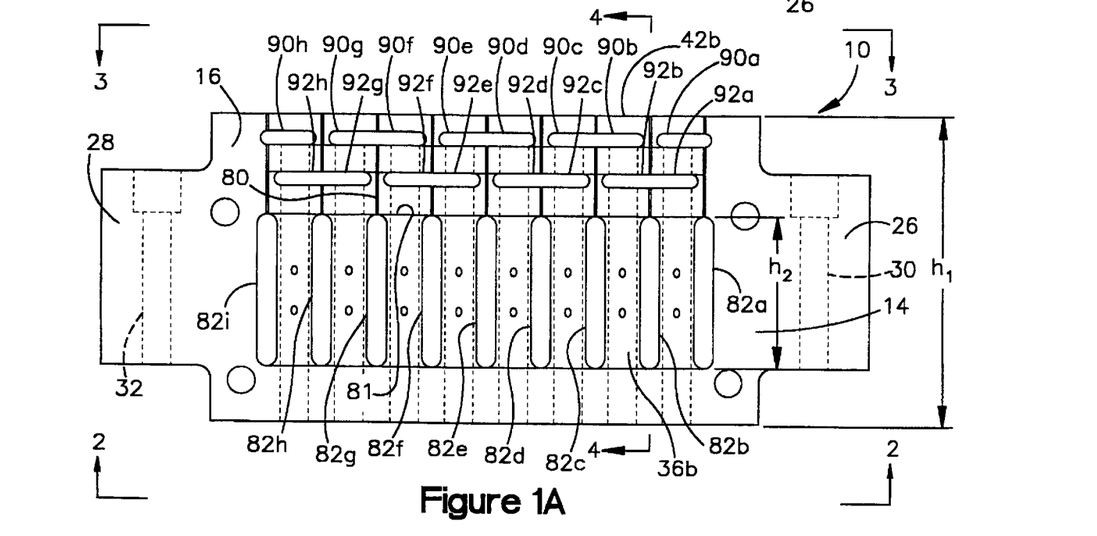
FIG. 1A is a side view through line 1A—1A of FIG. 1 showing the triaxial force pin sensor array.

Continuing, a plurality of generally oval shaped channels 82a, 82b, 82c, 82d, 82e, 82f, 82g, 82h, 82i (82a–82i) of height $h_2$ extend completely through the distance $w_4$ of the support structure 12 as generally shown in FIG. 1A. Each of these channels 82a–82i reduces the width of pins 36a–36h from the initial spacing of $t_1$, as in the upper portion 46b, to the spacing $t_2$ in the intermediate portion 56b, as shown in FIG. 5. Then the front and rear surfaces 58b, 60b, respectively of intermediate portions 56b of pin 36b, as well as the remainder of the pins, are formed so that the intermediate portions 56a–56h are rectangular or square about a longitudinal axis 44a–44h (only 44b being illustrated) extending through the pins. The intermediate portions 56a–56h each have four curved, concave surfaces extending about the upper end and contiguously joined with the upper portions 46a–46h of the pins 36a–36h, respectively. The intermediate portions also have four curved, concave surfaces extending about the lower end which are joined contiguously with the base portions 66a–66h of the pins 36a–36h, respectively.

A pair of slots 90a, 90b, 90c, 90d, 90e, 90f, 90g, 90h (90a–90h) and 92a, 92b, 92c, 92d, 92e, 92f, 92g, 92h (92a–92h) with radiused closed ends for each pin 36a–36h, as shown in FIGS. 1A, 5 and 5A, extend from the front surface 48b to the rear surface 50b of the exemplary cantilevered pin 36b. The upper slots 90a–90h are parallel with their corresponding lower slots 92a–92h in each pin 36a–36h, respectively. The pair of corresponding upper and lower slots for each pin open outwards from opposite facing side surfaces, i.e., 48b and 50b in the example of pin 36b. A connecting section 87b, extending a distance $h_5$ between the upper slot 90b and the lower slot 92b, has front and rear facing surfaces 91b and 93b which are recessed inward from the front and rear surfaces 48b and 50b, respectively, of portion 46b and are spaced from each other a distance $w_5$ which is less than distance $w_1$. Preferably, the front and rear facing surfaces 91b and 93b are each in a plane which is parallel to the plans in which the front and rear surfaces 48b and 50b of upper portion 46b are disposed. The orientation of slots in adjacent pins may be mirror imaged to facilitate machining operations. With this configuration, normal loads ($F_z$) can be accurately sensed regardless of contact position with the pin 36b on upper surface 42b. A plurality of blind bores 108a–108h extend up through the lower end 20 of the support structure 12 into each of the cantilever force pins 36a–36h, respectively. The blind bores 108a–108h pass through slots 92a–92h and open into slots 90a–90h to provide a passageway to receive electrical signal conducting wires (not shown), as discussed below. Also, a pair of spaced through holes 110a–110h are cut through each pin 36a–36h from the front side 58b to the internal bore 108b. Also a pair of through holes 111a–111h are cut from the rear side 60b of the pin and into the internal bore 108b, as shown in FIG. 4. The sets of spaced through holes 110a–110h and 111a–111h are disposed preferably with their longitudinal axis 113, 115 forming an angle "x" of about 90°. The electrical signal conducting wires from the strain gauges, discussed below, are passed through the holes 110a–110h and 111a–111h and into their corresponding bores 108a–108h.

The material for constructing the support structure 12 is preferably a material selected from the group consisting essentially of aircraft aluminum (Al2024) having a material proportional limit of 30,000 psi ($2.07 \times 10^8$ newtons/meter$^2$ (n/m$^2$)) and beryllium copper (BeCu) having a material proportional limit of 100,000 psi. ($6.89 \times 10^8$ n/m$^2$). While both the beryllium copper and the aircraft aluminum are effective for the present design of the pin sensor array 10, the beryllium copper is more advantageous in that it has a more durable wear surface and a higher material proportional limit. The higher material proportional limit is particularly important because it is desirable that as the force pins 36a–36h move, they will naturally return to their original positions without any plastic deformation. This is particularly the case in their movement towards one side 22 or the other side 24 of the support structure 12. With this movement, the pins 36a–36h will abut either against an adjacent pin or possibly side portions 14 and 16 in the case of pins 36a and 36h as a pin is moved from the forces applied thereto. Since the material proportional limit of the beryllium copper is high, any contact with an adjacent force pin or side portions 14, 16 will automatically prevent plastic deformation of the moving pin because the material proportional limit of the sensor array 10 requires a greater degree of movement to achieve plastic deformation than that afforded by the distance between adjacent pins and/or the side portions. Another advantage of the beryllium copper is it being a relatively rigid material. A still further advantage of the beryllium copper is its natural shielding capability which reduces electromagnetic interference (EMI) and radio frequency (RF) contamination of the sampled data.

Figure 2:
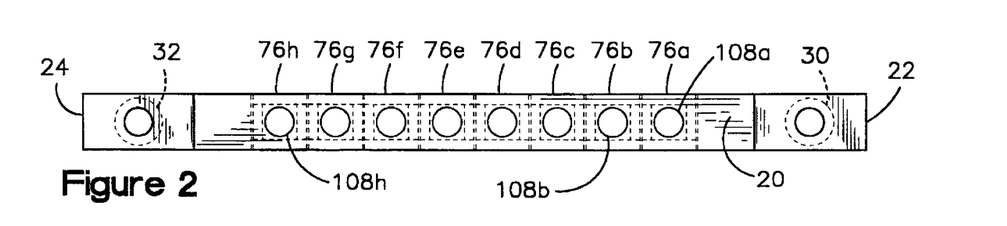
FIG. 2 is a bottom view through line 2—2 of FIG. 1A.
Figure 3:
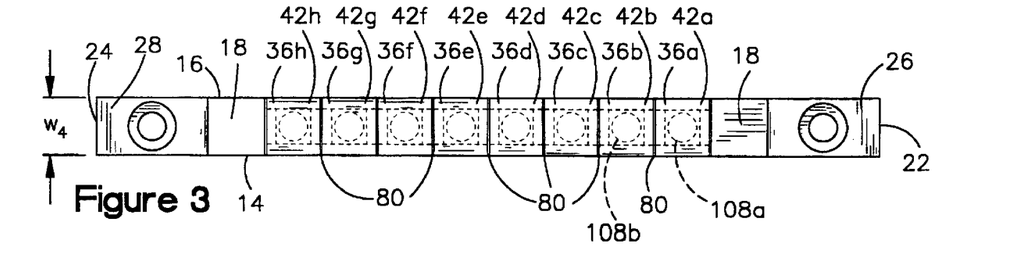
FIG. 3 is a top view through line 3—3 of FIG. 1A.
Figure 5B:
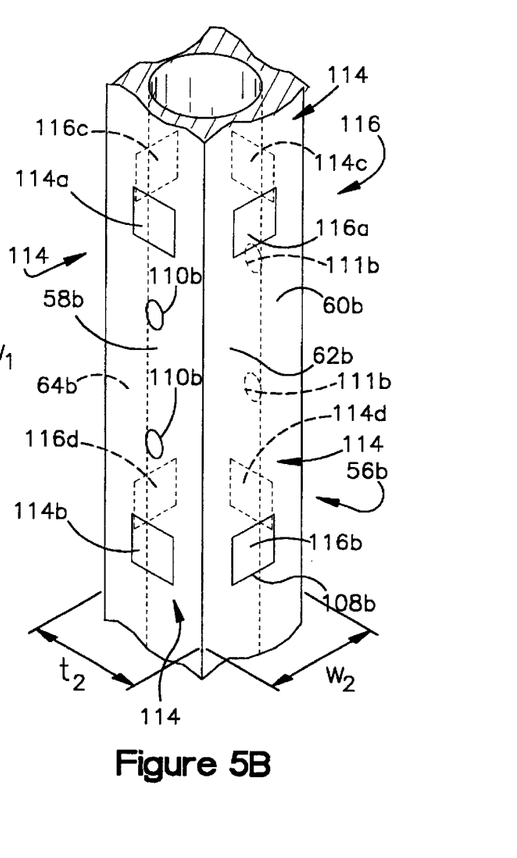
FIG. 5B is an enlarged view of the central portion of the triaxial force pin shown in FIG. 5.
Figure 6:
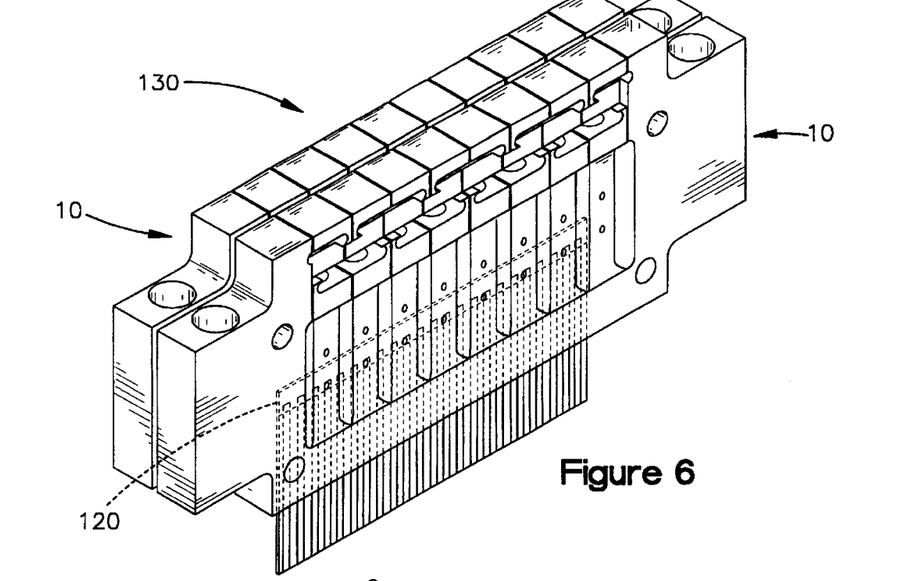
FIG. 6 is an assembly view of two triaxial force pin sensor arrays mounted together to form a triaxial force pin sensor array module.

Three sets of strain gauges 112, 114, 116, as best shown in FIGS. 5, 5A, and 5B, are mounted onto each cantilever pin 36a–36h of the force pin support structure 12. For example, the first set of strain gauges 112 includes two dual strain gauges 112a and 112b which are mounted onto the side faces of reduced sections 91b and 93b, respectively, as shown in FIGS. 5 and 5A. The second set of strain gauges 114 as shown in FIG. 5B, which includes four strain gauges 114a, 114b, 114c, 114d are mounted on opposite sides 58b and 60b, respectively, of the pin 36b in the intermediate portion 56b. The third set of strain gauges 116, which includes four gauges 116a, 116b, 116c and 116d, are located on the sides 62b and 64b, respectively, of intermediate portion 56b. Each of the strain gauge sets 112, 114, and 116 has signal conducting wires (not shown) which, in the case of strain pair 112 are directed through the bore 108b and out the lower open end for attachment to a circuit card 120 as described below. The strain gauge sets 114 and 116 have signal conducting wires disposed through bores 110b and 111b signal conducting wires disposed through bores 110b and 111b which intersect bore 108b so that the wires can also project outward from the open end of bore 108b, as shown in FIG. 2. These signal conducting wires, which extend outwards from the lower end 20 of the support structure 12, can be attached to a circuit card 120 incorporating a plurality of copper strips. Two of the triaxial force pin sensor arrays 10 are mounted to opposite surfaces of the circuit card 120, as shown in FIG. 6, by conventional means such as screws. This combination of two triaxial force pin sensor arrays with a circuit card therebetween, constitutes a single replaceable force sensor array module 130.

Because of the differences in operating environments, the strain gauges require proper thermal characteristics. Generally, strain gauges can be selected with thermal compensation for steel, copper or aluminum as determined by the material to which the gauges will be attached. Since the material from which the cantilever pins 36a–36h are constructed is preferably beryllium copper, copper compensated gauges will preferably be selected for the sets of strain gauges 112, 114 and 116. The gauges can be mounted by conventional means, such as an epoxy adhesive, to the pins.

PROTECTIVE SEALANT

Around each of the cantilever pins 36a–36h, including within the slits 80, is provided a low modulus sealant to prevent dust and dirt particles from accumulating therein. The sealant has a modulus of between about 100 psi (6.89× $10^5$ n/m$^2$) and 1000 psi (6.89×$10^6$ n/m$^2$). It is believed that a modulus below about 100 psi, which would typically be a gel, would lack the adhesion needed to be utilized for the purpose of preventing the accumulation of dirt and dust particles. On the other hand, if the modulus became too high, such as above about 1000 psi, the material would prevent the free movement of the pins as needed. A preferred material is a silicone rubber RTV No. 3140 from Dow-Corning.

SENSOR ARRAY MODULE

Preferably, a complete triaxial force pin sensor array module 130, as shown in FIG. 6, would include two triaxial force pin sensor arrays 10 with a circuit card 120 having copper bars disposed there between. The signals from the sets of strain gauges 112, 114 and 116 can be taken directly from the sensor array modules 130 and then conditioned and processed in a data collecting system 132, as shown in FIG. 7, such as for example a Datronic Model 10K7 measurement and control unit from Datronic Corporation of Miamisburgh, Ohio. In accordance with the invention, a single sensor array module 130 can be quickly and easily replaced, with a minimum of downtime, when defective. Moreover, the sensor array module 130 can be constructed with cantilever pins in close proximity in the x—x and y—y directions providing for high density measurements.

An important aspect of the cantilevered pin construction relates to the dimensional relationship within each pin 36a–36h. The lateral and tangential (fore-aft) compliance (measure of stiffness) is determined by the placement of the intermediate portion 56a–56h with respect to the base portion 66a–66h, respectively, and the upper portion 46a–46h, respectively. For example, as the intermediate portion 56a–56h is located closer to the bottom surface 76a–76h, respectively, the gain or total displacement of the upper surface 42a–42h increases for a given load. Moreover, the heights of the intermediate portions 56a–56h determines the maximum lateral or tangential load that can be applied before mechanical interference with an adjacent pin is reached.

In a like manner, the sensitivity for measurement of normal pressures or forces is governed by the selected width $w_5$ for shear plate members 87a–87h in conjunction with the depth of slots 90a–90h and 92a–92h, respectively. For example, as the width $w_5$ of shear plate member 87b, as shown in FIGS. 5 and 5A, is reduced, the response is increased for a given normal load. The distances $w_2$, $t_2$, and $h_2$ of the intermediate portion 56a–56h also affects the compliance or deflection of the corresponding cantilevered pin 36a–36h with a given lateral or tangential load.

The diameter of the blind bore 108a–108h also affects the compliance or deflection of its corresponding cantilevered pin. Thus, as the diameter of the bore 108a–108h increases, the compliance or deflection in the lateral, tangential and normal directions increases for a given load.

In a related aspect of the pin construction, dimensional variations pin to pin will naturally occur. These variations are accommodated by maintaining individual calibration values for each pin.

STRAIN GAUGE MEASUREMENTS

The strain gauge sets 112, 114, 116 are mounted on pins 36a–36h to measure the normal and shear forces generated on the upper contact surfaces 42a–42h of the cantilever pins 36a–36h, respectively. For use with a tire, a plurality of the sensor array modules 130 can be mounted in a sensor array mounting frame structure 34, only a single module 130 being illustrated in FIG. 7, so that the fore-aft direction, i.e. the direction in which the tire being measured rotates across the upper surface of the modules, is in an x—x direction to measure a complete tread element in a single pass. Transverse to the fore-aft direction is the lateral or y—y direction. The normal or load contact pressure is measured in the z—z direction. A second embodiment of the invention provides for rotation of the sensor array mounting frame structure 34 such that the x—x and y—y directions are inverted or reversed to measure an entire rib of a tire in a single pass over the triaxial force sensor array modules in box-like structure 34.

The upper set of strain gauges 112a and 112b measure normal load $F_x$ on the shear plate section 87a–87h of the pins 36a–36h, respectively. The shear plate section 87a–87h is generally that section between the lower slots 92a–92h and the upper slots 90a–90h of the pins 36a–36h, respectively. As a load, such as a tire, rolls across the contact surfaces 42a–42h of a pin 36a–36h, the pin deflects to change the resistance of strain gauge pairs 112a and 112b of set 112.

Figure 9:
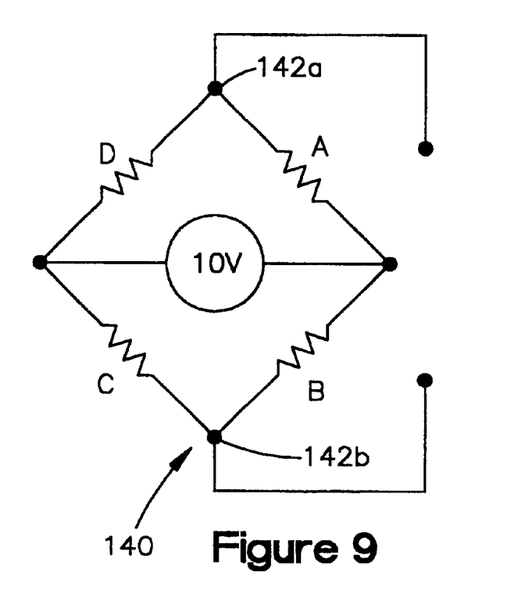
FIG. 9 is a schematic illustration of a bridge circuit associated with the force pin sensors of the triaxial force pin sensor array of the present invention for measuring forces, such as those generated in the footprint of a tire.

In the same manner, the strain gauge sets 114 and 116 respond to movements of the upper contact surface 42a–42h in combinations of fore-aft and/or lateral directions. The signals generated by the strain gauge sets 112, 114, 116 are fed to Wheatstone bridges 140, as shown in FIG. 9, with resistors A, B, C, D (represented as A–D), one on each side. While each of the resistors A–D, in the preferred embodiment, has a value of about 700 ohms, it is within the terms of the invention to select resistors of different values. For example, strain gauge pairs 112a and 112b are each wired in series and each pair has a value of about 700 ohms. The Wheatstone bridge 140 is typically excited with a voltage of about 10 volts, however the specific voltage is not a part of the present invention and other voltages can be used. As shown in FIG. 9, the output signal is measured across points 142a and 142b, after the Wheatstone bridge has been balanced in a conventional manner. Each strain gauge set 112, 114, 116 represent two legs of a Wheatstone bridge, the remaining two legs 700 ohms each (corresponding to the example of the preferred embodiment), are provided with bridge completion circuitry.

It is apparent that there has been provided in accordance with this invention a triaxial force pin sensor array that can be used for measuring the actual forces generated in the footprint of a tire. The triaxial force pin sensor array includes a high density of individual force pin sensors in a modular design that allows for rapid replacement of defective sensor array elements and substantially prevents dirt and contamination from affecting force measurements. The triaxial force pin sensor array further reduces electromagnetic interference (EMI) and radio frequency (RF) contamination of the sampled data signals. The triaxial force pin sensor array exhibits uniform response in the normal direction, $F_z$, regardless of contact location with individual triaxial force pins of the sensor array. Further, the triaxial force pin sensor array features mechanical overload protection.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

We claim:

1. A triaxial force pin sensor array for performing triaxial force measurements at multiple adjacent locations, the triaxial force measurements at each location consisting of simultaneous measurements of linear forces along three orthogonal axes, the triaxial force pin sensor array characterized by:

a plurality of cantilever force pins machined from a single rectangular block of material to form a linear array of adjacent cantilever force pins integral with a support structure, wherein a side surface of each one of the plurality of cantilever force pins is facing a side surface of an adjacent one of the plurality of cantilever force pins;

each of the plurality of cantilever force pins being constructed for performing triaxial force measurements, by having an upper portion with an upper contact surface for sensing normal force and tangential forces, both fore-aft and lateral, applied to the upper contact surface; and a base portion integral with a base portion of the support structure;

each of the plurality of cantilever force pins having an intermediate portion of reduced cross section between the upper portion and the base portion;

the linear array and each of the plurality of cantilever force pins having a front surface and a back surface parallel to the plane of the linear array; and each cantilever force pin having two slots machined through from the front surface to the back surface and disposed across the upper portion of the cantilever force pin in spaced relation to the upper contact surface to form a shear plate section between the two slots, each of the two slots opening to opposite facing side surfaces of the cantilever force pin and being disposed at different distances from the upper contact surface.

2. The triaxial force pin sensor array of claim 1 wherein each cantilever force pin is characterized in that:

the reduced cross section of the intermediate portion extends around the perimeter of the cantilever force pin so that the intermediate portion is rectangular with respect to an axis extending longitudinally through the cantilever force pin.

3. The triaxial force pin sensor array of claim 2 wherein each cantilever force pin is characterized by:

a first set of sensors mounted to the shear plate section of the upper portion for measurement of normal forces; and a second set and a third set of sensors mounted to the intermediate portion for measurement of fore-aft and lateral tangential forces, respectively.

4. The triaxial force pin sensor array f claim 3 wherein each cantilever force pin is characterized in that:

all sensors in the first set of sensors, the second set of sensors, and the third set of sensors are strain gauges.

5. The triaxial force pin sensor array of claim 4 wherein each cantilever force pin is characterized in that:

all of the strain gauges are mounted and wired in a way that measures orthogonal linear forces while avoiding measurement of moment force couples, such that:

the first set of sensors comprises two pairs of strain gauges with a first pair mounted on the front surface of the shear plate section and a second pair mounted on the back surface of the shear plate section, wherein the first pair is wired in series to form a first leg of a normal force bridge circuit and the second pair is wired in series to form a second leg of the normal force bridge circuit;

the second set of sensors comprises two pairs of strain gauges with a first pair mounted on the front surface of the intermediate portion and a second pair mounted on the back surface of the intermediate portion, with the sensors of each pair being located one at the top and one at the bottom of the intermediate portion, wherein the first pair is wired in series to form a first leg of a fore-aft force bridge circuit and the second pair is wired in series to form a second leg of the fore-aft force bridge circuit; and the third set of sensors comprises two pairs of strain gauges with a first pair mounted on a first side surface of the intermediate portion and a second pair mounted on an opposing second side surface of the intermediate portion, with the sensors of each pair being located one at the top and one at the bottom of the intermediate portion, wherein eh first pair is wired in series to form a first leg of a lateral force bridge circuit and the second pair is wired in series to form a second leg of the lateral force bridge circuit.

6. The triaxial force pin sensor array of claim 2 wherein each cantilever force pin is characterized in that:

the intermediate portion of the cantilever force pin has a substantially square cross section in a plane normal to an axis extending longitudinally through the cantilever force pin.

7. The triaxial force pin sensor array of claim 1 wherein each cantilever fore pin is characterized in that:

the cantilever force pin has a substantially square cross section in a plane normal to an axis extending longitudinally through the cantilever force pin.

8. The triaxial force pin sensor array of claim 7 wherein each cantilever force pin is characterized by:

a first set of strain gauges mounted to the shear plate section of the upper portion;

a second set and a third set of strain gauges mounted to the intermediate portion;

at least one front through hole cut through the intermediate portion from the front surface to the circular bore, and at least one back through hole cut through the intermediate portion from the back surface to the circular bore; and the first, second and third sets of strain gauges having electrical wires that pass through the front through holes or the back through holes and then through the circular bore to be connected to a circuit card.

9. The triaxial force pin sensor array of claim 1 wherein each cantilever force pin is characterized by:

a circular bore extending through the cantilever force pin from the base portion to the slot closest to the upper contact surface.

10. The triaxial force pin sensor array of claim 1 wherein each cantilever force pin is characterized in that:

the cantilever force pin is constructed of a material having a material proportional limit of at least about 30,000 psi ($2.07 \times 10^8$ n/m$^2$) to about 100,000 psi ($6.89 \times 10^8$ n/m$^2$).

11. The triaxial force pin sensor array of claim 10 wherein each cantilever force pin is characterized in that:

the cantilever force pin is constructed of a material selected from the group consisting of aircraft aluminum and beryllium copper.

12. The triaxial force pin sensor array of claim 1 wherein each cantilever force pin is characterized in that:

the upper contact surface is flat.

13. The triaxial force pin sensor array of claim 1 wherein each cantilever force pin is characterized in that:

the upper contact surface is concave.

14. The triaxial force pin sensor array of claim 1 wherein each cantilever force pin is characterized in that:

the upper contact surface is convex.

15. The triaxial force pin sensor array of claim 1 wherein each cantilever force pin is characterized in that:

the upper contact surface is radiused.

16. The triaxial force pin sensor array of claim 1 characterized by:

a sealant around each of the plurality of cantilever force pins, the sealant having a modulus between about 100 psi ($6.89 \times 10^5$ n/m$^2$) and about 1000 psi ($6.89 \times 10^6$ n/m$^2$).

17. The triaxial force pin sensor array of claim 16 characterized in that:

the sealant is silicone rubber.

18. The triaxial force pin sensor array of claim 1 characterized by:

a triaxial force pin sensor array module comprising two triaxial force pin sensor arrays mounted together with a circuit card disposed therebetween to form a rectangular array of cantilever force pins.

19. A method of performing triaxial force measurements at multiple adjacent locations, the triaxial force measurements at each location consisting of simultaneous measurements of linear forces along three orthogonal axes, the method characterized by the steps of:

utilizing a triaxial force pin sensor array comprising a plurality of cantilever force pins machined from a single rectangular block of material to form a linear array of adjacent cantilever force pins integral with a support structure;

measuring forces applied to an upper contact surface on an upper portion of one or more cantilever force pins mounted at an opposite base portion end integral with a base portion of a support structure, each of the cantilever force pins having an intermediate portion of reduced cross section between the upper portion and the base portion and having two slots disposed across the upper portion of the cantilever force pin in spaced relation to the upper contact surface to form a shear plate section;

measuring shear plate signals with a first set of strain gauges mounted to the shear plate section, the shear plate signals corresponding to the normal fore applied to the upper contact surface; and measuring forces tangential to the upper contact surfaces with second and third sets of strain gauges mounted to the intermediate portion of the cantilever force pins, the force signals corresponding to the tangential fores applied in the fore-aft and lateral directions to the upper contact surface.

20. The method of claim 19 characterized by further including the steps of:

conditioning and processing the shear plate and force signals from the first, second and third sets of strain gauges; and determining the local pressure and the tangential forces applied to the upper contact surface of each of the one or more cantilever force pins.

* * * * *